United States Patent
Handa et al.

(10) Patent No.: US 11,240,322 B2
(45) Date of Patent: Feb. 1, 2022

(54) REQUEST DISTRIBUTOR

(71) Applicant: Microsoft Technology Licensing, LLC, Redmond, WA (US)

(72) Inventors: Anurag Handa, Bothell, WA (US); Arun R. Mannengal, Bellevue, WA (US); Jyothish K. Nair, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 795 days.

(21) Appl. No.: 15/469,095

(22) Filed: Mar. 24, 2017

(65) Prior Publication Data

US 2018/0278687 A1 Sep. 27, 2018

(51) Int. Cl.
*H04L 29/08* (2006.01)
*G06Q 30/00* (2012.01)
*G06Q 10/10* (2012.01)

(52) U.S. Cl.
CPC ............. *H04L 67/18* (2013.01); *G06Q 10/10* (2013.01); *G06Q 30/016* (2013.01); *H04L 67/327* (2013.01)

(58) Field of Classification Search
CPC ..... H04L 67/02; H04L 67/1097; H04L 67/18; H04L 67/22; H04L 51/04; H04L 67/327; G06Q 10/10; G06Q 30/016
See application file for complete search history.

(56) References Cited

U.S. PATENT DOCUMENTS

| | | | |
|---|---|---|---|
| 8,140,441 B2 | 3/2012 | Cases et al. | |
| 8,458,323 B1 | 6/2013 | Baade et al. | |
| 8,792,631 B2 * | 7/2014 | Addair | H04M 3/5233 379/265.01 |
| 8,996,642 B1 | 3/2015 | Bellin et al. | |
| 9,274,863 B1 | 3/2016 | Qiu et al. | |
| 2006/0191020 A1 * | 8/2006 | Miller | G06F 21/602 726/28 |
| 2008/0056233 A1 * | 3/2008 | Ijidakinro | H04L 29/06027 370/352 |

(Continued)

OTHER PUBLICATIONS

"Incident Management", http://www.servicenow.com/products/it-service-automation-applications/incident-management.html, Retrieved on: Feb. 17, 2017, 3 pages.

*Primary Examiner* — Dhairya A Patel

(74) *Attorney, Agent, or Firm* — International IP Law Group, PLLC

(57) ABSTRACT

Various systems and methods for request distribution are described herein. In an example, a system for request distribution includes a storage to store instructions and a processor. In an example, upon execution of the instructions, the processor instructs the system to identify an endpoint for routing a request based on a request value using a global lookup table. In an example, upon execution of the instructions, the processor instructs the system to generate a case identifier, wherein the case identifier includes a case hint based on the endpoint for routing the request. In an example, upon execution of the instructions, the processor instructs the system to route the request to an independent scale group based on the case hint, wherein the independent scale group is selected based on a co-location of a geographic interaction point for a service agent and a data shard corresponding to the request.

20 Claims, 6 Drawing Sheets

(56) References Cited

U.S. PATENT DOCUMENTS

| | | |
|---|---|---|
| 2010/0161673 A1 | 6/2010 | Kandanala et al. |
| 2012/0323623 A1* | 12/2012 | Sabharwal ..... G06Q 10/063112 |
| | | 705/7.14 |
| 2013/0018803 A1 | 1/2013 | Challu |
| 2014/0081875 A1 | 3/2014 | Pierson et al. |

* cited by examiner

300

REQUEST DISTRIBUTOR

BACKGROUND

Routing a large number of requests from customers, employees, and business partners can be handled by a communications system to match these requestors with an agent to handle their request. Managing a large number of requests can involve requestors and data that is dispersed across many geographic locations. Many locations may include their own local rules of communication. The large potential distance between the locations of a requesting user, an agent, and the data to address the request can cause latency issues that can increase in seriousness corresponding to the number of requests made and addressed over time.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment provides a system that distributes requests. In an example, a system for request distribution includes storage to store instructions, and a processor. In an example, upon execution of the instructions, the processor instructs the system to identify an endpoint for routing a request based on request information and a global lookup table. In an example, upon execution of the instructions, the processor instructs the system to generate a case identifier, such as a case number or other identifier, wherein the case identifier includes a case hint based on the endpoint for routing. In an example, upon execution of the instructions, the processor instructs the system to route the request to an independent scale group based on the case hint, wherein the independent scale group is selected based on a co-location of a geographic interaction point for a service agent and a data shard corresponding to the request.

An embodiment provides a method for request distribution. In an example, the method may include identifying an endpoint for routing a request based on a request value using a global lookup table. In an example, the method may include generating a case identifier, wherein the case identifier includes a case hint based on the endpoint for routing. In an example, the method may include routing the request to an independent scale group based on the case hint, wherein the independent scale group is selected based on a co-location of a geographic interaction point for a service agent and a data shard corresponding to the request.

Another embodiment provides a tangible, computer-readable medium including instructions that, when executed by a processor, distribute requests. In an example, a processor executing instructions may identify an endpoint for routing a request based on a request value using a global lookup table. In an example, a processor executing instructions may generate a case identifier, wherein the case identifier includes a case hint based on the endpoint for routing. In an example, a processor executing instructions may route the request to an independent scale group based on the case hint, wherein the independent scale group is selected based on a co-location of a geographic interaction point for a service agent and a data shard corresponding to the request.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
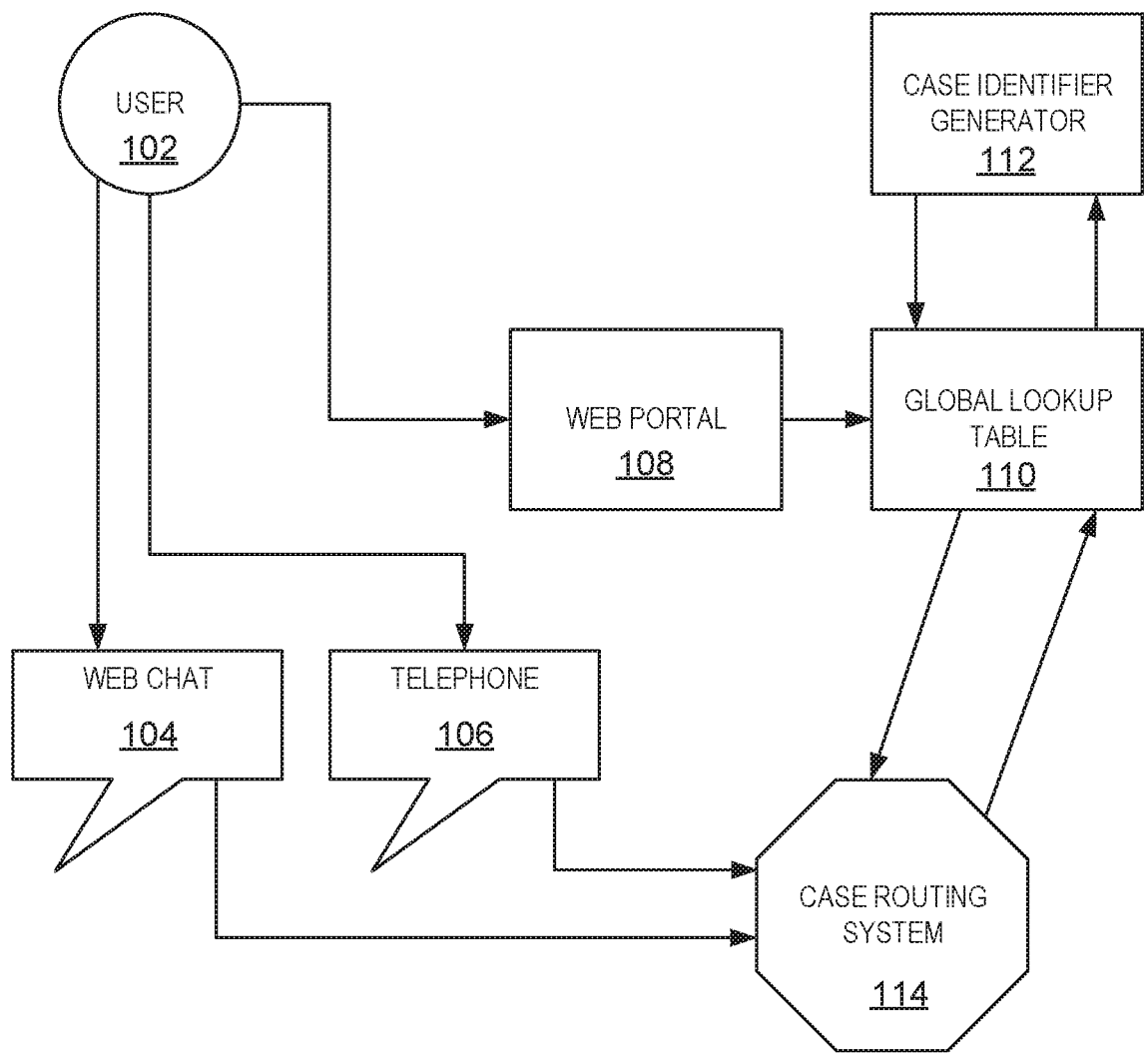
FIG. 1 is a schematic of an example of an intake and case identifier generation for a request.

Companies or systems with a global presence may encounter latency or delay times due to distances between nodes of communication. In an example, delays in a customer service area can result from a data read or write command that is executed with data that is not local. To improve and reduce latency times for a communication system, such as a customer support framework, requests are disclosed herein as being routed to a service center that stores local data specific to the request. When the data for addressing a request is local to the service agent handling the request, this data can be called co-located, and avoids longer latencies associated with longer data transit distances.

Some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

The term "logic" encompasses any functionality for performing a task. For instance, the operations illustrated in the flowcharts corresponds to logic for performing that operation. An operation can be performed using software, hardware, firmware, physical electronic circuits, and the like, or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). Computer-readable storage media does not include all implementations of computer-readable media generally, such as signals per se. Therefore, in contrast, computer-readable media generally (i.e., not computer-readable storage media) may additionally include communication media such as transmission media for wireless signals and the like.

FIG. 1 is a schematic of an example of an intake 100 and case identifier generation for a request. As used herein, the term case identifier refers to any information that is used to associate a case with a user request. The case identifier may include alphanumeric characters, among other things. While the blocks shown in FIG. 1 are shown separately, several of the blocks may function in a single device or across several devices.

A user 102 may make a request. In an example, the user 102 may be a customer, an employee, a business partner, a computer system, or any other entity that can make a request that may need to be routed by a request routing system. A few examples of what a potential request could entail include: a question about a particular product, a request for service during a certain set of hours, a request for contact to the user 102 be initiated. In an example, a user 102 may be a customer requesting information regarding an issue, case, incident, or ticket.

The user 102 can make a request using a number of communication channels. In some embodiments, a user 102 may use a web chat 104 to make a request. In an example, the web chat 104 can be a live or real time communication portal with an intake service or intake officer to handle and obtain information from the user 102.

The user 102 can use a telephone communication 106 to make a request. In an example, a telephone communication 106 may include a telephone call including a voice transmission to an intake service or intake officer, a text message to an intake service or intake officer, or other means of data transmission.

In some embodiments, the user 102 can also use web portal 108 to make a request. As used herein, web portal 108 is being used to refer to at least one of electronic mail or other asynchronous electronic communications. In an example, a web portal 108 can include email generated from a third party service used by the user, an interface accessed and operating on an intake service webpage, or another intake service portal such as a kiosk or an independent device for obtaining requests. As used herein, a web portal 108 communication from a user includes a request value that can include a value or values to represent information about a product, service, support topic, or request that identifies a general subject area or subject areas that may need to be addressed as part of a response to the request.

Based on the request value in the web portal 108, a global lookup table 110 is referenced. As used herein, a global lookup table 110 includes schema to sort requests by the request value and determine an ideal endpoint for handling of the request. In an example, the sorting by a global lookup table 110 may include use of schema to sort requests based on a combination of product information, a support request topic, a region of request origin, and other information in the text or metadata of the request itself. When a request is sent to the global lookup table 110, the global lookup table uses a case identifier generator 112 to generate a case identifier for the request based on the endpoint determined by the global lookup table. Based on the endpoint, the case identifier generator 112 can include a case hint that can be used to later route the request based on where a request solution may be found. In an example, a case identifier could be XXXXXX01YYYYY where the 01 is the case hint that could refer to an endpoint geographically located in the western United States. In an example, a case identifier could be XXXXXX02YYYYY where the 02 is the case hint that could refer to an endpoint geographically located in the eastern United States. As discussed more in FIG. 3, a case hint may also include safe harbor information.

Once a case identifier has been generated by the case identifier generator 112, the request, together with the case identifier and the case hint, can be sent to a case routing system 114. The case routing system 114 can route the request based on the case identifier with the case hint and the request value. The case routing system 114 may have access to route the request to an independent scale group based on the case hint, wherein the independent scale group is selected based on a co-location of a geographic interaction point for a service agent and data shard or personal data corresponding to the user. The specific routing to independent scale groups is addressed further in FIG. 2.

As shown in FIG. 1, the way in which a request is received from a user 102 may affect the handling of the request. When a request is received from a user 102 through a telephone communication 106 or a web chat 104, the request may proceed to a the case routing system to identify potential information in the request that can be sent to the global lookup table 110 for endpoint selection as described above.

Figure 2:
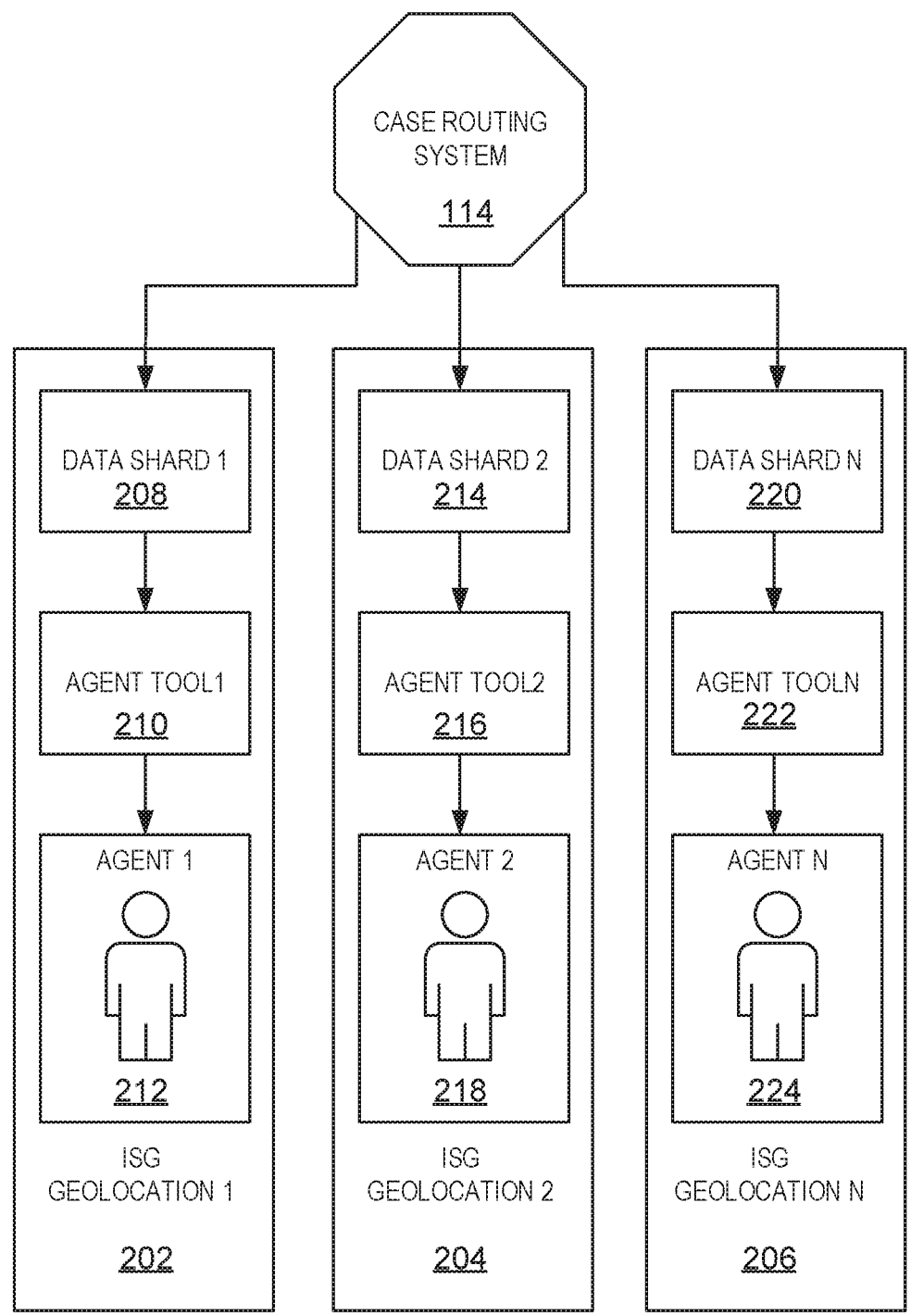
FIG. 2 is a schematic of an example of case routing between geographically distinct independent scale groups.

FIG. 2 is a schematic of an example of case routing 200 between geographically distinct independent scale groups. Like numbered items are as described for FIG. 1.

As discussed above for FIG. 1, the case routing system 114 may have access to route the request to an independent scale group based on the case hint. As used herein, an independent scale group refers to a group of computing components co-located within the same geographic environment. These computing components can include data storage, networking equipment, user interface devices, or processors, as well as other computing hardware. When a case routing system 114 has access to a request as well as a case identifier with a case hint, the case routing system may route the request. Further, intermediate hardware including intermediate switches and intermediate routers can make use of the case hint to route the request to the appropriate equipment in the intended independent scale group.

Independent scale group geolocation 1 202 refers to an independent scale group located in a particular geographic location. Independent scale group geolocation 2 204 refers to an independent scale group located in a particular geographic location. Independent scale group geolocation n 206 refers to an independent scale group located in a particular geographic location and the placeholder letter 'n' is used to indicate that any number of independent scale groups can be formed. Each independent scale group 1 202, 204, and 206 can correspond to different or distinct locations.

The case routing system 114 routes the request based on the case hint such that the data to respond to the request is located in a data store of an independent scale group. Accordingly, when a request is routed to independent scale group geolocation 1 202, this routing is based on the case hint indicating that the data to address the request is located within independent scale group geolocation 1 202.

The data for handling the request exists within the independent scale group as a data shard. As used herein, a data shard refers to a piece of data that represents a portion of the overall data for a product or topic. The data shard can also include information specific to a particular user or group of users who may be making a request. The creation of a data shard may occur during the generation of the global lookup table 110 as part of a schema dichotomy for separating topics, user information, product information, and other potential request information. In an example, the schema dichotomy can include product, support topic, support hours, support country, support language, or agent skills. In an example, the data shard is based on the location of the agent where a request for a particular product or support topic can be serviced. This grouping of service area and data for these services allows agents working on a request to access relevant data with reduced latency due since data is fetched locally and is also used by locally executed instructions.

Once the request has been routed to a specific independent scale group, the data shard 1 208 may be accessed by an agent tool 1 210 to aid an agent 1 212. As used herein, the agent tool 210 may be a portal or electronic interface to allow an agent to address the request. In an example, the agent may be a human or an electronic service to assess a request and address the request using data in the data shard. As the data shard is co-located with the agent, the access time may be reduced for read and write operations due to proximity imposed by the independent scale group. In an example, the co-location of an agent and the data for handling a type of request paired with proper routing of the request can avoid a round trip latency of approximately 340-350 milliseconds for requests.

This process for routing can be repeated or varied across independent scale groups based on the case hint. For example, rather than independent scale group geolocation 1 202, the case routing system 114 may route a request to other independent scale groups. Within one of these other independent scale groups, data shard 2 214, agent tool 2 216, and agent 2 218 can perform similar actions as described above, within the context of the independent scale group 2 204. Similarly, data shard n 220, agent tool n 222, and agent n 224 can perform similar actions as described above, within the context of the independent scale group geolocation n 206.

Figure 3:
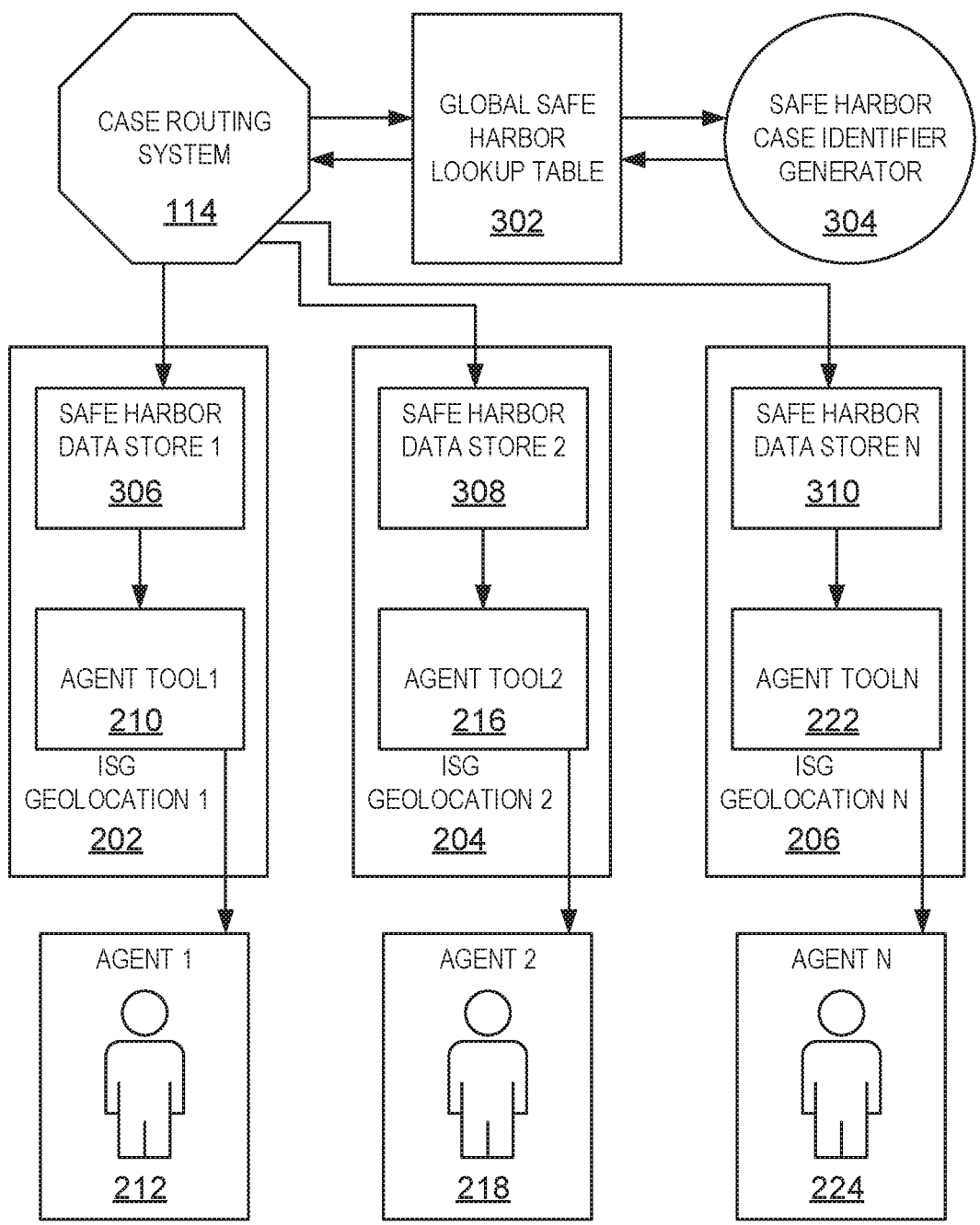
FIG. 3 is a schematic of an example of safe harbor case routing with independent scale groups.

FIG. 3 is a schematic of an example of safe harbor case routing 300 with independent scale groups. Like numbered items are as they are described in FIG. 1 and FIG. 2 including items 114, 202, 204, 206, 210, 212, 216, 218, 222, and 224.

As used herein, safe harbor information may refer to a legal guideline about handling of a request and request information. In an example, a legal guideline may refer to a national border that request information or data shards for that data that would be illegal to enter or exit. In an example, a legal guideline may refer to a certain request that may not be serviced in a particular geolocation. In an example, a legal guideline may refer to a frequency of a request that may not be serviced in a geolocation. As there are many legal guidelines that may be included as part of a safe harbor restriction, the above examples are only given as examples and other legal guidelines can also be included.

When a request is made in the context of a safe harbor system, this safe harbor information may be sorted and incorporated into a global safe harbor lookup table 302. Similar to the lookup table described above, the global safe harbor lookup table 302 provides a target endpoint for a request based on the request value, and additionally includes safe harbor information in the determination of a target endpoint. In an example, if the request regarded personal data that was not allowed to leave a country of a user, then the global safe harbor lookup table 302 would restrict a target endpoint to an endpoint complying with the safe harbor information. In an example, there may be more than one potential endpoint that complies with a safe harbor restriction. The global safe harbor lookup table 302 can then reference a location that includes the data most relevant to addressing the request value.

As part of the routing process, the global safe harbor lookup table 302 may refer to a safe harbor case identifier generator 304 to generate a safe harbor case identifier. While the safe harbor case identifier generation process is similar to the case identifier generation process above, the safe harbor case identifier generator may generate a safe harbor hint. The safe harbor hint may indicate to the case routing system 114 that a certain safe harbor restriction is in effect and that the request can be routed accordingly. In an example, the safe harbor hint may be combined or separate from the case hint.

Based on the safe harbor case identifier and other information received from the global safe harbor lookup table 302, the case routing system can route a request between a number of independent scale groups.

In independent scale group geolocation 1 202, a safe harbor data store 1 306 can store information in the independent scale group geolocation 1 202 that may comply with safe harbor restrictions. Safe harbor data store 2 308 and safe harbor data store n 310 perform similar functions for their respective independent scale groups.

Additionally, as shown in FIG. 3, when dealing with safe harbor data stores, the agent may or may not be located within the region of the independent scale group. In some cases, the safe harbor restrictions could be complied with as well as the agent could be co-located within the independent scale group to reduce data latency. When a safe harbor restriction is enforced, the safe harbor restriction can be given priority over the co-location of the agent in the independent scale group. In an example, the management of this system and hierarchy can be achieved through a multi-tenant software as a service application.

Figure 4:
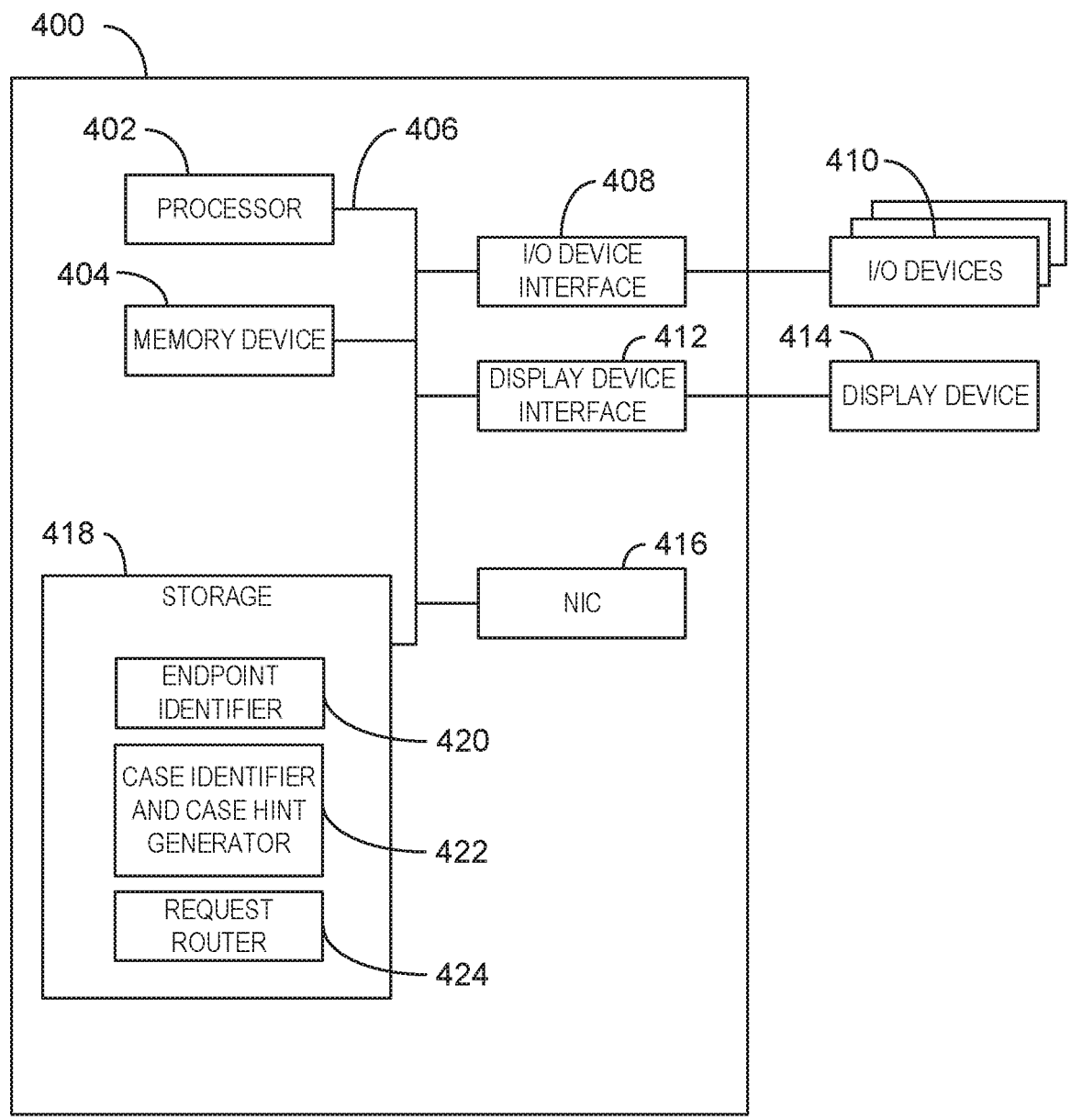
FIG. 4 is a block diagram of an example of a computing system for request distribution.

FIG. 4 is a block diagram of an example of a computing system for request distribution. The computing system 400 may be, for example, a mobile phone, laptop computer, desktop computer, or tablet computer, among others. The computing system 400 may include a processor 402 that is adapted to execute stored instructions, as well as a memory device 404 that stores instructions that are executable by the processor 402. The processor 402 can be a single core processor, a multi-core processor, a computing cluster, or any number of other configurations. The memory device 404 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems.

The processor 402 may be connected through a system bus 406 (e.g., PCI, ISA, PCI-Express, NuBus, etc.) to an input/output (I/O) device interface 408 adapted to connect the computing system 400 to one or more I/O devices 410. The I/O devices 410 may include, for example, a keyboard, a gesture recognition input device, a voice recognition device, and a pointing device, wherein the pointing device may include a touchpad or a touchscreen, among others. The I/O devices 410 may be built-in components of the computing system 400, or may be devices that are externally connected to the computing system 400.

The processor 402 may also be linked through the system bus 406 to a display device interface 412 adapted to connect the computing system 400 to a display device 414. The display device 414 may include a display screen that is a built-in component of the computing system 400. The display device 414 may also include a computer monitor, television, or projector, among others, that is externally connected to the computing system 400. A network interface card (NIC) 416 may also be adapted to connect the computing system 400 through the system bus 406 to a network (not depicted).

The storage 418 can include a hard drive, an optical drive, a USB flash drive, an array of drives, cloud storage, network area storage, or any other suitable storing means or combinations thereof. The storage 418 may include an endpoint identifier 420, a case identifier and case hint generator 422, and a request router 424.

The endpoint identifier 420 can identify an endpoint for routing a request based on a request value using a global lookup table. In an example, the global lookup table uses a schema to identify the location of a data shard associated with the request value. In an example, the request value includes a safe harbor restriction, and the case hint reflects the safe harbor restriction. In an example, the request value includes one or more of product manufacturing information, geographic location of a service center, a broad topic included in the request, the date the request was made, the country of origin of the request, a predominant language of the country of origin of the request, or a location associated with the user of the request.

The case identifier and case hint generator 422 can generate a case identifier, wherein the case identifier includes a case hint based on the endpoint for routing. The request router 424 can route the request to an independent scale group based on the case hint. In an example, the independent scale group is selected based on a co-location of a geographic interaction point for a service agent and a data shard corresponding to the request. In an example, if there exists no co-location of a geographic interaction point and the data shard, then a nearest geographic location of a geographic interaction point is selected instead. In an example, the request is routed first by the safe harbor restriction and then by the co-location of the geographic interaction point and the data shard.

This system may also instruct the system to process the request from a web portal, telephone communication, or web chat. This example system addresses the problem of latency through multiple shards in data stores co-located in the region of the Agent. In an example, the case identifier for a ticket or incident corresponds to the location of the data that may be worked upon a majority of time in order to circumvent responsive issues especially with read and write instructions.

The presently disclosed technique attempts to distribute data so that the agents may work on data that is closest to their regions. The routing sends requests towards data shards so that the data is local or at least close. In an example, this may further be refined by only routing requests that are likely to result in write request that have write time latencies below a threshold value. The present techniques may use the shard mechanism and look-up strategies that can co-locate data and the request that the data may be used to service.

It is to be understood that the block diagram of FIG. 4 is not intended to indicate that the computing system 400 is to include all the components shown in FIG. 4. Rather, the computing system 400 can include fewer or additional components not illustrated in FIG. 4 (e.g., additional applications, additional modules, additional memory devices, additional network interfaces, etc.). Furthermore, any of the functionalities of the endpoint identifier 420, case identifier and case hint generator 422, and request router 424 may be partially, or entirely, implemented in hardware and/or in the processor 402. For example, the functionality may be implemented with an application specific integrated circuit, in logic implemented in the processor 402, or in any other device.

Figure 5:
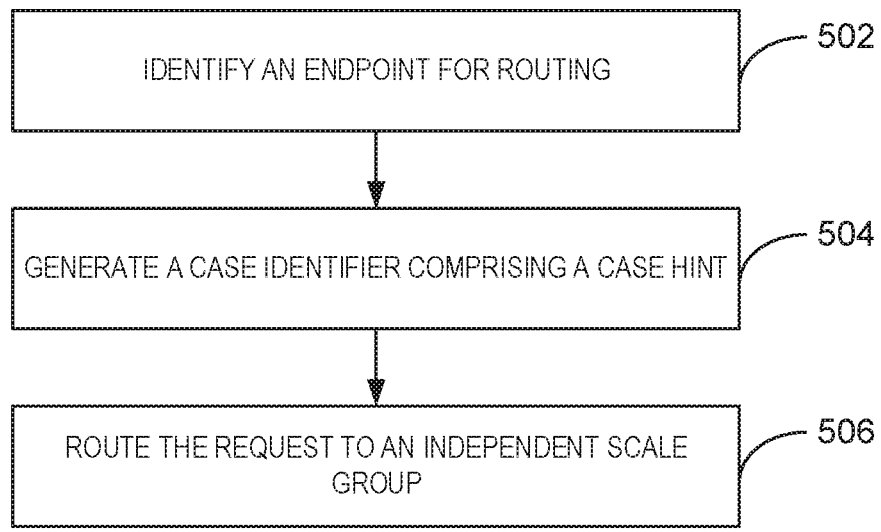
FIG. 5 is a process flow diagram of an example process for request distribution.

FIG. 5 is a process flow diagram of an example process for request distribution. The elements of the method shown here are presented in an example order, however, other orders of this method can also function. The method 500 can be implemented with any suitable computing device, such as the computing system 400 of FIG. 4.

At block 502, the method 500 includes identifying an endpoint for routing a request based on a request value using a global lookup table. In an example, the global lookup table uses a schema to identify the location of a data shard associated with the request value. In an example, the request value includes a safe harbor restriction, and the case hint reflect the safe harbor restriction. In an example, the request value includes one or more of product manufacturing information, geographic location of a service center, a broad topic included in the request, the date the request was made, the country of origin of the request, a predominant language of the country of origin of the request, or a location associated with the user of the request.

At block 504, the method 500 includes generating a case identifier, wherein the case identifier includes a case hint based on the endpoint for routing. At block 506, the method 500 includes routing the request to an independent scale group based on the case hint. In an example, the independent scale group is selected based on a co-location of a geographic interaction point for a service agent and a data shard corresponding to the request. In an example, if there exists no co-location of a geographic interaction point and the data shard, then a nearest geographic location of a geographic interaction point is selected. In an example, the request is routed first by the safe harbor restriction and then by the co-location of the geographic interaction point and the data shard.

This method 500 may also include processing the request from a web portal, telephone communication, or web chat. This example system addresses the problem of latency through multiple shards in data stores co-located in the region of the Agent. In an example, the case identifier for a ticket or incident corresponds to the location of the data that may be worked upon a majority of time in order to circumvent responsive issue especially with read and write actions.

In one embodiment, the process flow diagram of FIG. 5 is intended to indicate that the steps of the method 500 are to be executed in a particular order. Alternatively, in other embodiments, the steps of the method 500 can be executed in any suitable order and any suitable number of the steps of the method 500 can be included.

Figure 6:
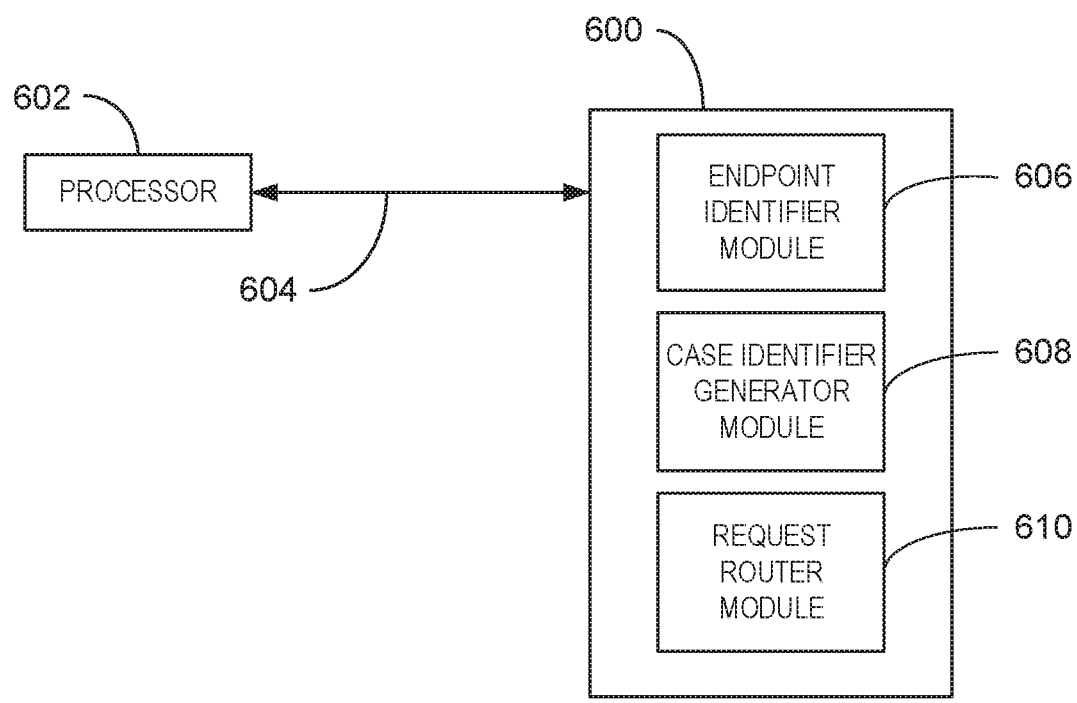
FIG. 6 is block diagram of an example computer-readable storage media for request distribution.

FIG. 6 is block diagram of an example computer-readable storage media for request distribution. The tangible, computer-readable storage media 600 may be accessed by a processor 602 over a computer bus 604. Furthermore, the tangible, computer-readable storage media 600 may include code to direct the processor 602 to perform the steps of method 500.

The various software components discussed herein may be stored on the tangible, computer-readable storage media 600, as indicated in FIG. 6. For example, the tangible computer-readable storage media 600 can endpoint identifier module 606 to identify an endpoint for routing a request based on a request value using a global lookup table. In an example, the global lookup table uses a schema to identify the location of a data shard associated with the request value. In an example, the request value includes a safe harbor restriction, and the case hint reflect the safe harbor restriction. In an example, the request value includes one or more of product manufacturing information, geographic location of a service center, a broad topic included in the request, the date the request was made, the country of origin of the request, a predominant language of the country of origin of the request, or a location associated with the user of the request.

The tangible computer-readable storage media 600 can include a case identifier generator module 608 to generate a case identifier, wherein the case identifier includes a case hint based on the endpoint for routing. The tangible computer-readable storage media 600 may also include a request router module 610 to route the request to an independent scale group based on the case hint. In an example, the independent scale group is selected based on a co-location of a geographic interaction point for a service agent and a data shard corresponding to the request. In an example, if there exists no co-location of a geographic interaction point and the data shard, then a nearest geographic location of a geographic interaction point is selected. In an example, the request is routed first by the safe harbor restriction and then by the co-location of the geographic interaction point and the data shard.

This tangible, computer-readable storage media 600 may also instruct the system to process the request from a web portal, telephone communication, or web chat. This example system addresses the problem of latency through multiple shards in data stores co-located in the region of the Agent. In an example, the case identifier for a ticket or incident corresponds to the location of the data that may be worked upon a majority of time in order to circumvent responsive issue especially with read and write actions.

It is to be understood that any number of additional software components not shown in FIG. 6 may be included within the tangible, computer-readable storage media 600, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

EXAMPLES

Example 1

An example system for request distribution may include a storage device to store instructions and a processor, that upon execution of the instructions, instructs the system to identify an endpoint for routing a request based on a request value and a global lookup table. The example system may generate a case identifier, wherein the case identifier comprises a case hint based on the endpoint for routing the request. The example system may route the request to an independent scale group based on the case hint. In an example, the independent scale group may be selected based on a co-location of a geographic interaction point for a service agent and a data shard corresponding to the request. In an example, the processor may detect that there is no co-location of a service agent to process the request and a data shard corresponding to the request and select the independent scale group based on a distance from a request location to a location of the independent scale group. In an example, the request value may include a safe harbor restriction, and the case hint may reflect the safe harbor restriction. The example may include an independent scale group that is selected based on a co-location of a geographic interaction point for a service agent and data shard, where the request value comprises a safe harbor restriction, the case hint reflects the safe harbor restriction, and a route of the request determined with priority given first by the safe harbor restriction and then by the co-location of the geographic interaction point and the data shard. In the example the request value includes one or more of product manufacturing information, a geographic location of a service center, a broad topic included in the request, a date the request was detected, a country of origin of the request, a predominant language of the country of origin of the request, or a location associated with a user making the request. In the example, the global lookup table uses a schema to identify a location of a data shard associated with the request value. In the example, wherein the processor, upon execution of the instructions, instructs the system to process the request from a web portal. In the example, the processor, upon execution of the instructions, instructs the system to process the request from a telephone communication. In the example, wherein the processor, upon execution of the instructions, instructs the system to process the request from a web chat application.

Example 2

A method for request distribution may include identifying an endpoint for routing a request based on a request value using a global lookup table, generating a case identifier, wherein the case identifier comprises a case hint based on the endpoint for routing the request, and routing the request to an independent scale group based on the case hint. In the example, the independent scale group is selected based on a co-location of a geographic interaction point for a service agent and a data shard corresponding to the request. The example may further include detecting that there is no co-location of a service agent to process the request and a data shard corresponding to the request, and selecting the independent scale group based on a distance from a request location to a location of the independent scale group. In the example, the request value comprises a safe harbor restriction, the case hint reflects the safe harbor restriction. In the example, the independent scale group is selected based on a co-location of a geographic interaction point for a service agent and data shard, the request value comprises a safe harbor restriction, the case hint reflects the safe harbor restriction, and a route of the request determined with priority given first to the safe harbor restriction and then to the co-location of the geographic interaction point and the data shard. In the example, wherein the request value comprises one or more of product manufacturing information, geographic location of a service center, a broad topic included in the request, a date the request was made, a country of origin of the request, a predominant language of the country of origin of the request, or a location associated with a user making the request.

Example 3

An example tangible computer-readable storage media may include instructions that, in response to an execution by a processor, cause the processor to identify an endpoint for routing a request based on a request value using a global lookup table, generate a case identifier, wherein the case identifier comprises a case hint based on the endpoint for routing the request, and route the request to an independent scale group based on the case hint. In the example, the independent scale group is selected based on a co-location of a geographic interaction point for a service agent and a data shard corresponding to the request. In the example, the processor may also detect that there is no co-location of a service agent to process the request and a data shard corresponding to the request, and select the independent scale group based on a distance from a request location to a location of the independent scale group. In the example, the request value comprises a safe harbor restriction, and the case hint reflects the safe harbor restriction.

What is claimed is:

1. A system for request distribution comprising:
a storage device to store instructions;
a processor, that upon execution of the instructions, instructs the system to:
identify an endpoint for routing a request based on a request value and a global lookup table;
generate a case identifier, wherein the case identifier comprises a case hint based on the endpoint for routing the request; and
route the request to an independent scale group based on the case hint, wherein the independent scale group is selected based on a co-location of a geographic interaction point for a service agent and a data shard corresponding to the request.

2. The system of claim 1, wherein the data shard is information specific to a user making the request.

3. The system of claim 1, wherein, the processor is to:
detect that there is no co-location of a service agent to process the request and a data shard corresponding to the request; and
select the independent scale group based on a distance from a request location to a location of the independent scale group.

4. The system of claim 1, wherein:
the request value comprises a safe harbor restriction; and
the case hint reflects the safe harbor restriction.

5. The system of claim 1, wherein:
the independent scale group is selected based on a co-location of a geographic interaction point for a service agent and data shard;
the request value comprises a safe harbor restriction;
the case hint reflects the safe harbor restriction; and
a route of the request determined with priority given first by the safe harbor restriction and then by the co-location of the geographic interaction point and the data shard.

6. The system of claim 1, wherein the request value comprises one or more of product manufacturing information, a geographic location of a service center, a broad topic included in the request, a date the request was detected, a country of origin of the request, a predominant language of the country of origin of the request, or a location associated with a user making the request.

7. The system of claim 1, wherein the global lookup table uses a schema to identify a location of a data shard associated with the request value.

8. The system of claim 1, wherein the processor, upon execution of the instructions, instructs the system to process the request from a web portal.

9. The system of claim 1, wherein the processor, upon execution of the instructions, instructs the system to process the request from a telephone communication.

10. The system of claim 1, wherein the processor, upon execution of the instructions, instructs the system to process the request from a web chat application.

11. A method for request distribution, comprising:
identifying an endpoint for routing a request based on a request value using a global lookup table;
generating a case identifier, wherein the case identifier comprises a case hint based on the endpoint for routing the request; and
routing the request to an independent scale group based on the case hint, wherein the independent scale group is selected based on a co-location of a data shard and a geographic interaction point for a service agent.

12. The method of claim 11, wherein the data shard is information specific to a user making the request.

13. The method of claim 11, wherein the method comprises:
detecting that there is no co-location of a service agent to process the request and a data shard corresponding to the request; and
selecting the independent scale group based on a distance from a request location to a location of the independent scale group.

14. The method of claim 11, wherein:
the request value comprises a safe harbor restriction; and
the case hint reflects the safe harbor restriction.

15. The method of claim 11, wherein:
the independent scale group is selected based on a co-location of a geographic interaction point for a service agent and the data shard;
the request value comprises a safe harbor restriction;
the case hint reflects the safe harbor restriction; and
a route of the request determined with priority given first to the safe harbor restriction and then to the co-location of the geographic interaction point and the data shard.

16. The method of claim 11, wherein the request value comprises one or more of product manufacturing information, geographic location of a service center, a broad topic included in the request, a date the request was made, a country of origin of the request, a predominant language of the country of origin of the request, or a location associated with a user making the request.

17. A tangible computer-readable storage media comprising instructions that, in response to an execution by a processor, cause the processor to:
   identify an endpoint for routing a request based on a request value using a global lookup table;
   generate a case identifier, wherein the case identifier comprises a case hint based on the endpoint for routing the request; and
   route the request to an independent scale group based on the case hint, wherein the independent scale group is selected based on a co-location of a data shard and a geographic interaction point for a service agent.

18. The tangible computer-readable storage media of claim 17, wherein the data shard is information specific to a user making the request.

19. The tangible computer-readable storage media of claim 17, wherein, the processor may also:
   detect that there is no co-location of a service agent to process the request and the data shard corresponding to the request; and
   select the independent scale group based on a distance from a request location to a location of the independent scale group.

20. The tangible computer-readable storage media of claim 17, wherein:
   the request value comprises a safe harbor restriction; and
   the case hint reflects the safe harbor restriction.

* * * * *